United States Patent
Graves

(10) Patent No.: US 11,387,644 B2
(45) Date of Patent: Jul. 12, 2022

(54) MAGNETICALLY SATURABLE COMPONENTS AND CIRCUITS

(71) Applicant: L3 Cincinnati Electronics Corporation, Mason, OH (US)

(72) Inventor: Justin Graves, Middletown, OH (US)

(73) Assignee: L3 CINCINNATI ELECTRONICS CORPORATION, Mason, OH (US)

(*) Notice: Subject to any disclaimer, the term of this patent is extended or adjusted under 35 U.S.C. 154(b) by 0 days.

(21) Appl. No.: 16/940,638

(22) Filed: Jul. 28, 2020

(65) Prior Publication Data

US 2022/0037876 A1 Feb. 3, 2022

(51) Int. Cl.
| | | |
|---|---|---|
| H02H 9/00 | (2006.01) | |
| H02H 9/02 | (2006.01) | |
| H02M 1/32 | (2007.01) | |

(52) U.S. Cl.
CPC ............. *H02H 9/001* (2013.01); *H02H 9/02* (2013.01); *H02M 1/32* (2013.01)

(58) Field of Classification Search
CPC ....................... H02H 9/021; H02H 9/001–005
See application file for complete search history.

(56) References Cited

U.S. PATENT DOCUMENTS

| | | | |
|---|---|---|---|
| 4,868,790 A | 9/1989 | Ward | |
| 6,021,053 A * | 2/2000 | Baskette | .......... H03K 17/08148 |
| | | | 363/40 |
| 6,118,673 A | 9/2000 | Hua | |
| 7,532,488 B2 | 5/2009 | Tsuruya | |
| 8,115,343 B2 | 2/2012 | Sanders et al. | |
| 8,120,207 B2 | 2/2012 | Sanders et al. | |
| 9,438,025 B1 * | 9/2016 | Athan | .................... G01R 31/52 |
| 2005/0185962 A1 * | 8/2005 | Grace | ..................... G08C 23/04 |
| | | | 398/135 |
| 2008/0170667 A1 * | 7/2008 | Ernest | ...................... H05G 1/32 |
| | | | 378/101 |
| 2010/0046125 A1 * | 2/2010 | Husband | ................ H02H 9/021 |
| | | | 361/19 |
| 2019/0356231 A1 * | 11/2019 | Radic | ................ H02M 3/33576 |

FOREIGN PATENT DOCUMENTS

| | | |
|---|---|---|
| JP | 62290354 A | 12/1987 |
| JP | 06319258 A | 11/1994 |

* cited by examiner

*Primary Examiner* — Danny Nguyen
*Assistant Examiner* — Christopher J Clark
(74) *Attorney, Agent, or Firm* — Dinsmore & Shohl LLP

(57) ABSTRACT

Embodiments described herein are directed to inrush current limiters having a transformer. In one embodiment, an inrush current limiter includes a transformer including a primary winding, a secondary winding and a saturable magnetic core shared therebetween, a resistor connected in parallel with the secondary winding, wherein an impedance of the resistor is reflected across the transformer when a voltage is applied across the primary winding and the saturable magnetic core is not saturated, and a diode connected between the primary winding and ground.

20 Claims, 8 Drawing Sheets

MAGNETICALLY SATURABLE COMPONENTS AND CIRCUITS

TECHNICAL FIELD

Embodiments of the present disclosure are directed to magnetically saturable components and circuits. More specifically, the embodiments described herein are directed to inrush current limiter circuits having a saturable resistor.

BACKGROUND

Electronic circuits for space applications may be expensive because they need to be radiation-hardened (rad-hard) and protected against single event effects (SEE). These circuits may also require significant lead time to procure the required components. An example of one such circuit is an inrush current limiter, which is designed to limit inrush current due to sudden application of voltage. As an example, an inrush current limiter may be used in a switching power supply to protect the components of the switching power supply, such as protecting the diodes of the bridge rectifier from inrush current due to charged capacitors.

Terrestrial, non-radiation hardened inrush current limiter circuits and components are well-known and inexpensive. However, rad-hard inrush solutions are often very expensive and their components have significant lead-times.

Thus, alternative inrush current limiters and other rad-hard circuits having a reduced cost and a reduced lead time may be desirable.

SUMMARY

Embodiments described herein are directed to power switching circuits having a saturable resistor. In one embodiment, an inrush current limiter includes a transformer including a primary winding, a secondary winding and a saturable magnetic core shared therebetween, a resistor connected in parallel with the secondary winding, wherein an impedance of the resistor is reflected across the transformer when a voltage is applied across the primary winding and the saturable magnetic core is not saturated, and a diode connected between the primary winding and ground.

In another embodiment, a radiation hardened circuit includes a transformer; a diode connected between a first end of the transformer and ground, a power source connected between the diode and ground and a load connected between a second end of the transformer and ground. An impedance is reflected across the transformer, and the reflected impedance limits an inrush current.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to magnetically saturable components and circuits that employ such magnetically saturable components. In some embodiments, the circuits described herein are inrush current limiter circuits having a saturable resistor that limits an inrush current. Generally, the saturable component, such as a saturable resistor, is coupled in parallel to the secondary of a transformer. Upon receipt of a sudden application of voltage at the primary of the transformer, the saturable resistor is reflected from the secondary across to the primary. The saturable resistor limits the inrush current through the primary of the transformer thus protecting electronic components from inrush current. The saturable resistor is present until the core of the transformer saturates, when the presence of the saturable resistor at the primary essentially disappears. The inrush current limiter may be used in many applications, such as power supplies. As described in more detail below, embodiments are not limited to saturable resistors, as any component or circuit may be reflected from the secondary to the primary prior to the transformer becoming saturated.

The magnetically saturable components and circuits described herein may be particularly useful in environments where the components are required to be radiation-hardened (rad-hard), such as space applications. Rad-hard transformers, resistors and diodes of the embodiments disclosed herein are relatively inexpensive and readily available.

Various embodiments of magnetically saturable components and circuits are described in detail below.

Figure 1:
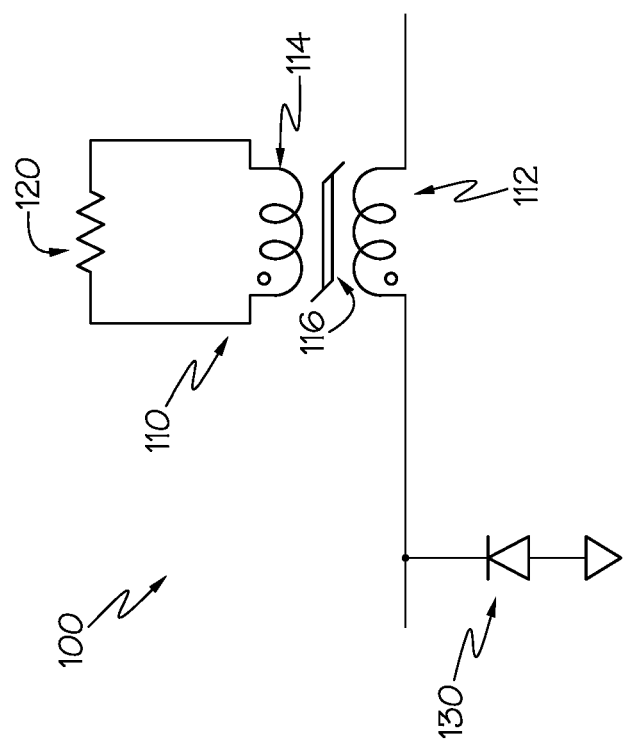
FIG. 1 schematically depicts an example inrush current limiter having a transformer and a saturable resistor, according to one or more embodiments described and illustrated herein.

FIG. 1 schematically depicts an example circuit configured as inrush current limiter 100. The example inrush current limiter 100 comprises a transformer 110, a resistor 120 (i.e., a saturable resistor) and a diode 130 (e.g., a free-wheeling diode). The transformer 110 includes a primary winding 112, a secondary winding 114, and a saturable magnetic core 116. The saturable magnetic core 116 is located (i.e., shared) between the primary winding 112 and the secondary winding 114. Upon receiving voltage across the primary winding 112, the saturable magnetic core 116 becomes fully saturated after a predetermined time (V*s). Thus, the transformer 110 provides a magnetic timer which expires after the predetermined time. The resistor 120 is connected in parallel across the secondary winding 114. An impedance of the resistor 120 is reflected across the transformer 110 and appears across the primary winding 112. The diode 130 is connected between the power supply side of the primary winding 112 and ground.

Figure 2:
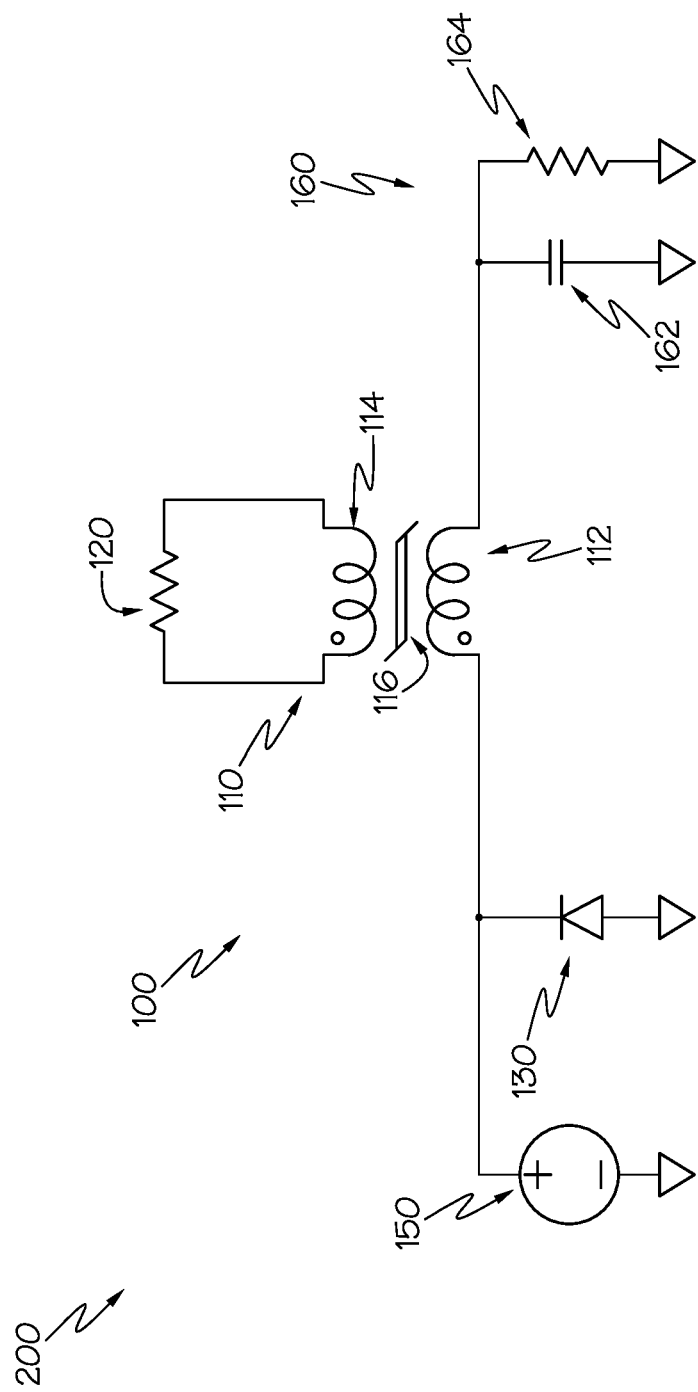
FIG. 2 schematically depicts an example circuit including the example inrush current limiter of FIG. 1, according to one or more embodiments described and illustrated herein.

FIG. 2 schematically depicts a circuit 200 in which the inrush current limiter 100 of FIG. 1 is electrically coupled to a power source 150 (e.g., a DC power source) and a load 160. As used herein, the phrase "electrically coupled" means either directly electrically coupled by electrical conductors or indirectly electrically coupled by way of intermediate electrical components and/or electrical conductors.

The power source 150 may be configured to apply a DC voltage. When a voltage is applied, inrush current flows through the primary winding 112. However, the reflected impedance of the resistor 120 limits inrush current into the load 160, thereby protecting the load 160 from inrush current. Thus, the resistor 120 is a "saturable resistor." The load 160 is represented by capacitor 162 and a resistor 164. However, it should be understood that the load 160 may include any number and type of components.

Upon expiration of the magnetic timer, the saturable magnetic core 116 becomes saturated, and the primary winding 112 and the secondary winding decouple 114 from each other, causing the primary winding 112 to become a short circuit such that the impedance of the resistor 120 essentially disappears (i.e., is not reflected) across the transformer 110. At some time after expiration of the magnetic timer, the circuit 200 enters a steady-state operation.

After the power source 150 is turned off, a voltage across the primary winding 112 changes polarity, which maintains a flow of magnetizing current. The magnetizing current circulates through free-wheeling diode 130. Once the saturable magnetic core 116 comes out of saturation (i.e., an un-saturated state), current flows until the saturable magnetic core 116 resets to remanence. Thus, the free-wheeling diode 130 can be utilized as a "reset mechanism" for the transformer 110. If the power source 150 turns on again, the reflected impedance of the resistor 120 again limits inrush current into the load.

Figure 3:
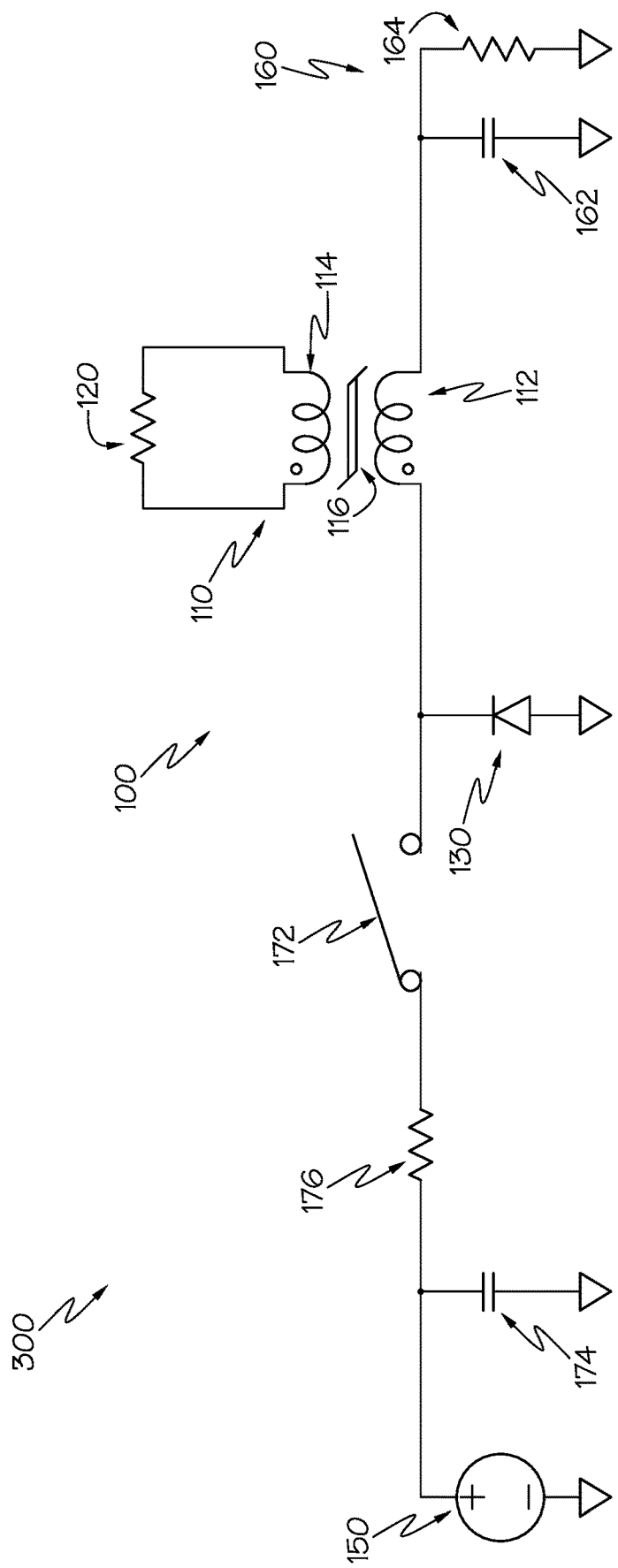
FIG. 3 schematically depicts another example circuit including the example inrush current limiter of claim 1, according to one or more embodiments described and illustrated herein.

FIG. 3 depicts an example electronic circuit 300 that was built for evaluating the effect of a saturable resistor on limiting inrush current. The electronic circuit 300 includes an inrush current limiter 100, a power source 150, a load 160, a switch 172, a capacitor 174 and a current sense resistor 176. In this example, the load 160 is provided by a capacitor 162 and a resistor 164. The capacitor 162 has a capacitance of 100 µF, and the resistor 164 has a resistance of 15 ohms. The primary winding 112 and the secondary winding 114 each have an inductance of 286 µH. The saturable resistor 120 has a resistance of 1 ohm.

The power source 150 is a 28V DC voltage source that is connected between the capacitor 174 and ground. The positive terminal of the capacitor 174 is connected to the resistor 176. The current sense resistor 176 (0.002 ohms) is connected in series with the switch 172. The switch 172 is between the current sense resistor 176 and the cathode of the diode 130. The resistor 164 of the load 160 is connected between the capacitor 162 at one end and ground at the other end. The capacitor 162 and the capacitor 174 are each of a polypropylene film type, and each have a capacitance of 100 µF and an equivalent series resistance (ESR) of 0.003 ohms.

The circuit 300 of FIG. 3 was used as a test circuit. To effectuate the test, the capacitor 174 is first charged when the 28V power source turns on. Then, switch 172 closes and the capacitor 174 is connected to the capacitor 162 through the primary winding 112 of the transformer 110. It is noted that the current sense resistor 176 is used as a current shunt to collect test data by measuring the voltage across the current sense resistor 176. The circuit 300 of FIG. 3 was also tested without the inrush current limiter 100, to compare the peak current with and without the inrush current limiter 100.

Other ancillary electrical components may be added to the electronic circuit depicted in FIG. 3 depending on the end application. It should be understood that embodiments are not limited by the ancillary electrical components shown in FIG. 3.

Figure 4:
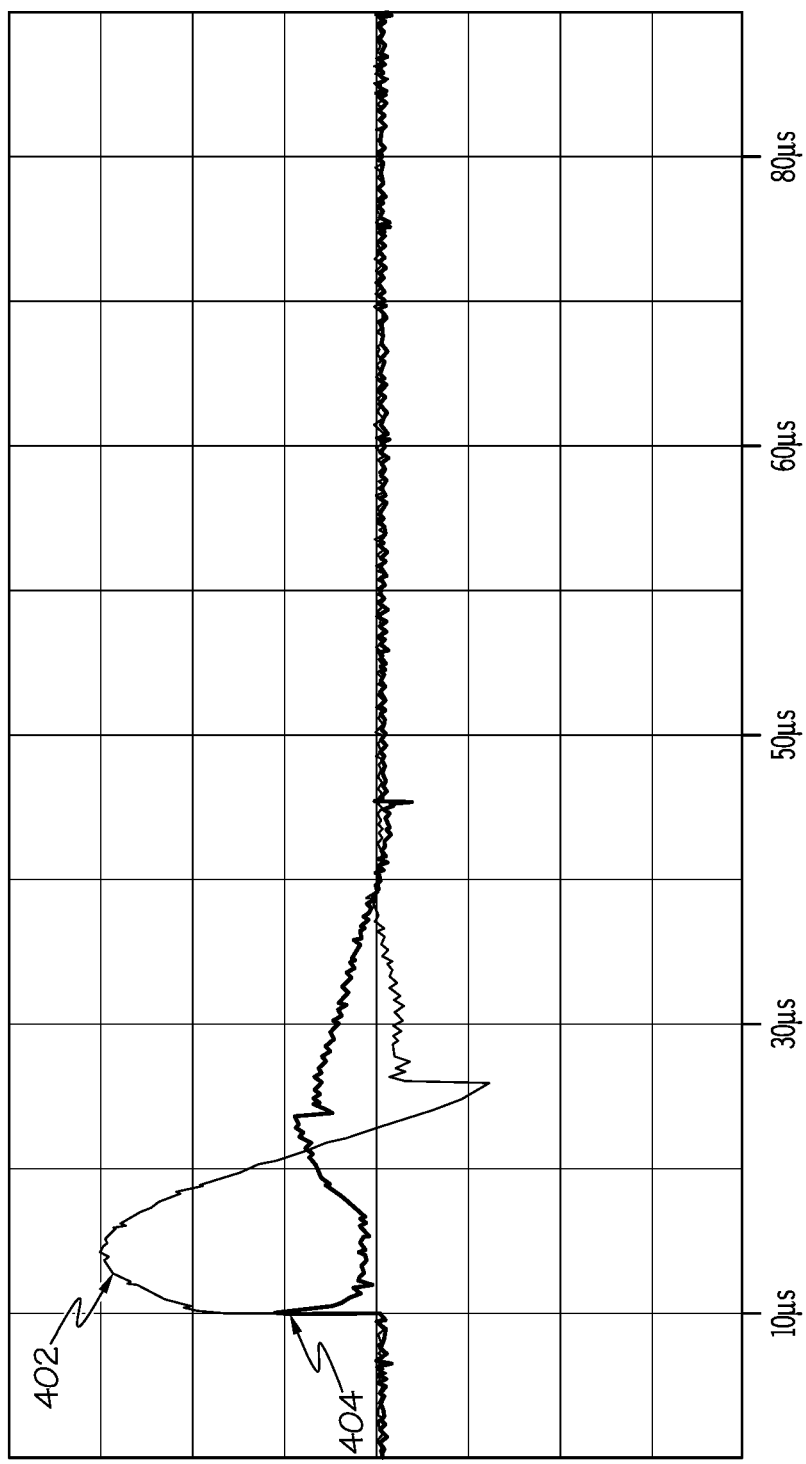
FIG. 4 illustrates an example graph of the circuit of FIG. 3 both with and without the inrush current limiter of FIG. 1 according to one or more embodiments described and illustrated herein.

FIG. 4 shows two waveforms according to the tests of the circuit 300 depicted by FIG. 3 with and without the inrush current limiter 100. The trace 404 is the current through the current sense resistor 176 with the inrush current limiter present, and the trace 402 is the current through the current sense resistor 176 without the inrush current limiter.

As shown by the trace 404, the peak current of the circuit of FIG. 3 including the inrush current limiter 100 was 112 amps. However, as shown by the trace 402, the peak current without the inrush current limiter 100 was 306 amps. Accordingly, the peak inrush of load current in the circuit of FIG. 3 is significantly reduced as compared to when the circuit does not have the inrush current limiter 100. Thus, the inexpensive components of the inrush current limiter 100 provide a cost-effective circuit to limit inrush current. Further, radiation-hardened components of the inrush current limiter 100 are inexpensive and readily available.

Figure 5:
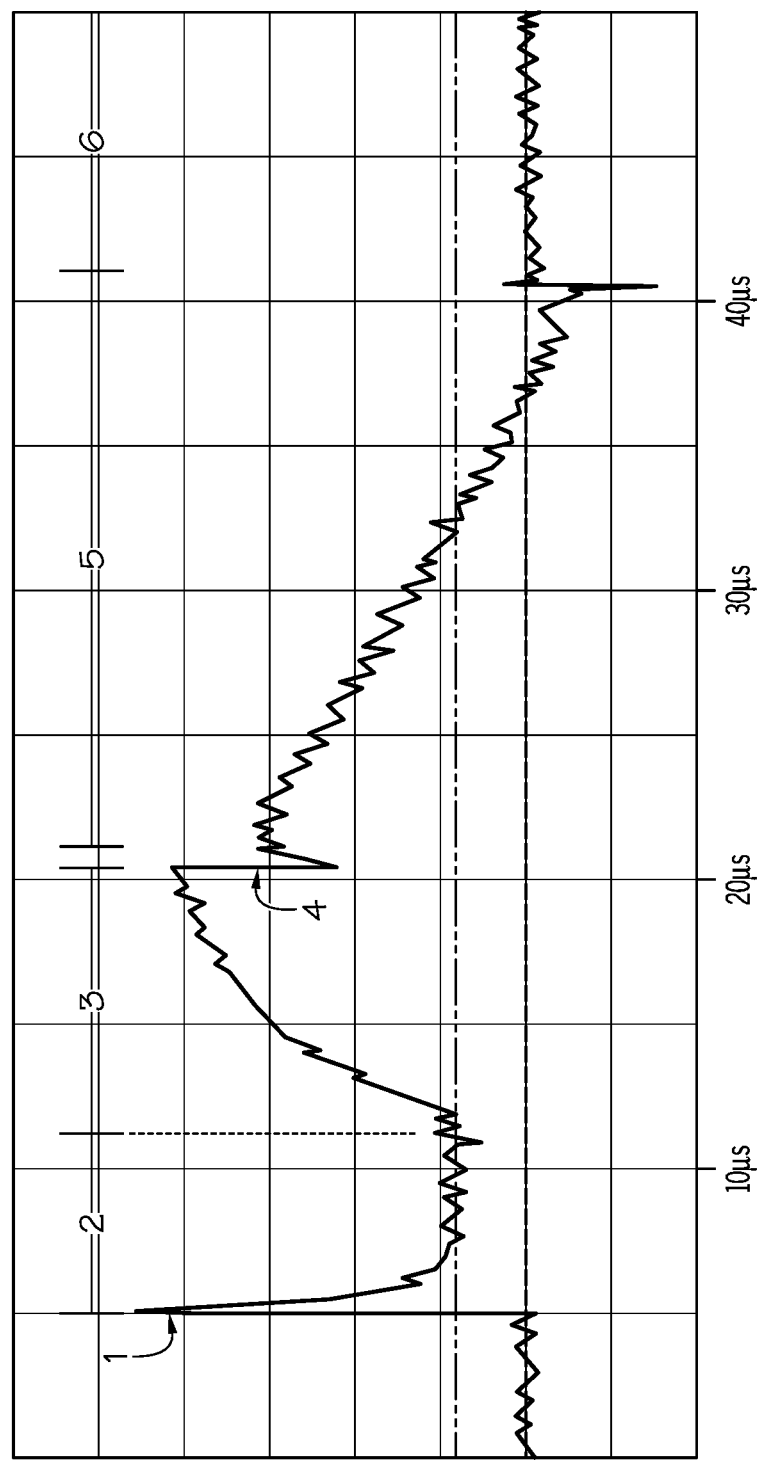
FIG. 5 illustrates a close-up view of the example graph of FIG. 4 illustrating the inrush current of the circuit of FIG. 2 when the inrush current limiter is used according to one or more embodiments described and illustrated herein.
Figure 6:
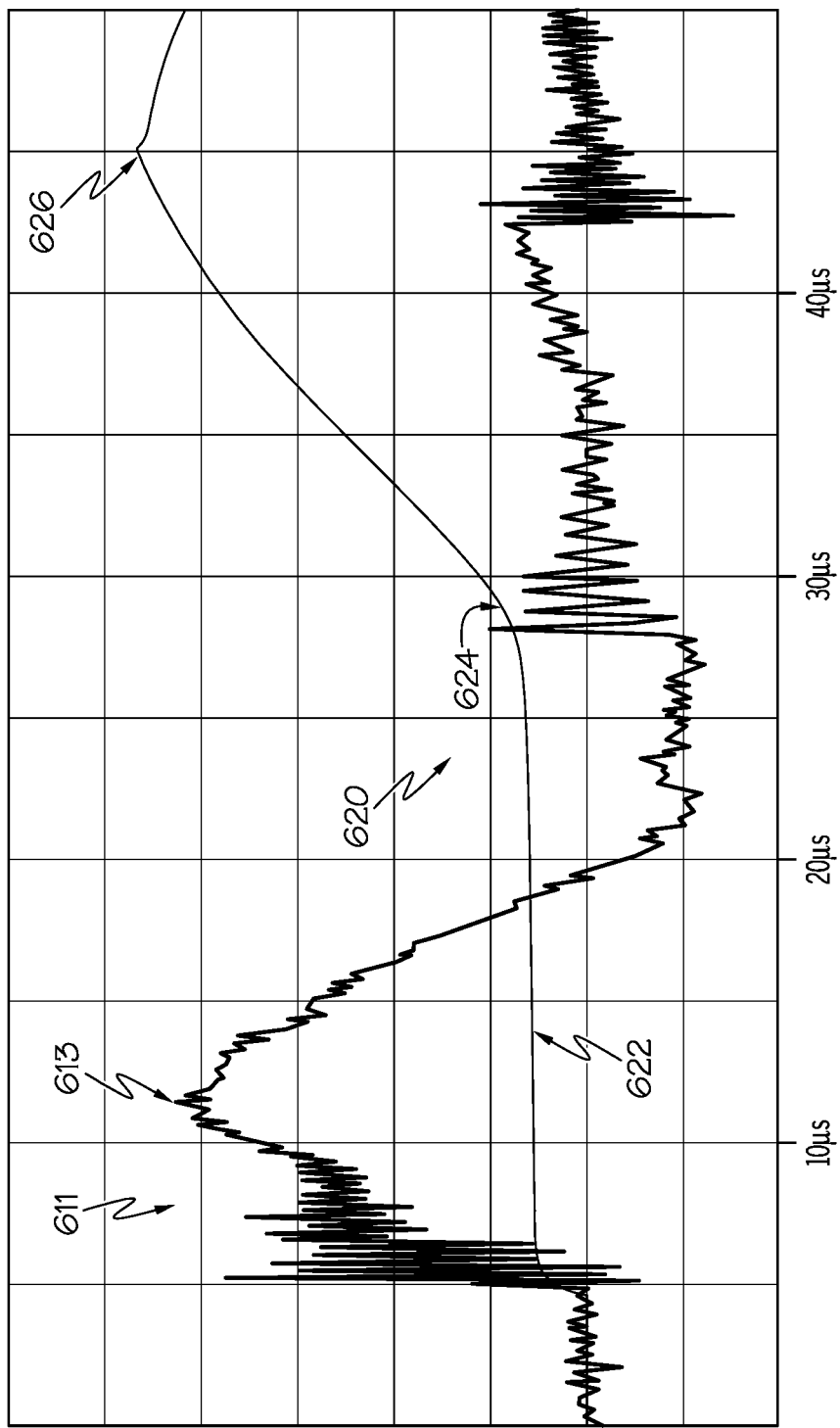
FIG. 6 illustrates another example graph of an example circuit both with and without an inrush current limiter according to one or more embodiments described and illustrated herein.

FIG. 5 is a close-up view of the trace 404 of FIG. 4 from the test using the circuit of FIG. 3 including the inrush current limiter 100. An example timeline of the events of the circuit 300 with respect to the trace 404 will now be described. At time-period #1, a step-voltage is applied with the switch 172 (FIG. 3). During time-period #2, the inrush current limiter 100 acts as a 1 ohm series resistor. In other words, the impedance of the saturable resistor 120 is reflected from the secondary winding 114 to the primary winding 112. Thus, the saturable resistor 120 reduces the peak inrush current.

During time-period #3, the current increases as the saturable core 116 of the transformer 110 nears saturation Thus, the current flowing into the load 160 increases. During time-period #4, the saturable core 116 of the transformer 110 reaches saturation. During time-period #5, inrush current continues to flow through the primary winding 112 and into the load 160. During time-period #6, a steady-state is reached.

Changing various characteristics of the inrush current limiter can affect various aspects of its behavior. For example, and without limitation, changing the size of the saturable core, the material of the saturable core, the number of turns of the primary winding, the turns ratio and/or the secondary resistance can affect the behavior of the inrush current limiter. Properties of the components of the inrush current limiter may be selected depending on the end-application.

Another test was performed using an inrush current limiter as an input to a 75 W Flyback converter power supply. Similar to the circuit 300 of FIG. 3, a 100 µF, 0.003 ohms ESR, polypropylene film capacitor was charged to 28V and then used as a step-voltage input to the Flyback converter, by hard-switching the 28V source onto the input of the Flyback converter. The input of the Flyback converter consisted of a bank of ceramic and Tantalum capacitors, which creates substantial inrush current when a step-voltage is applied. The inrush current limiter of this test differed from the inrush current limiter of FIG. 3 in that the saturable resistor was 10 ohms rather than 1 ohm and more transformer turns were used. Increasing the number of transformer turns increased the duration of the inrush limiter's magnetic timer, by increasing the Volt-second product of the transformer.

Trace 611 illustrates the inrush current into the Flyback converter power supply without an inrush current limiter, while trace 620 illustrates the inrush current into the Flyback converter power supply with the inrush current limiter described above. The y-axis is 25 amps per division for trace 611 and 5 amps per division for trace 620. At point 613 of trace 611, the peak inrush current is 108 amps without the inrush current limiter.

Trace 620 illustrates that during the time-period of region 622, the 10 ohm saturable resistor limits the inrush current to 2.8 amps. At point 624, the current increases as the saturable magnetic core of the transformer saturates. The peak inrush current of 23 amps is at point 626, where the inrush current begins to lessen.

Accordingly, the saturable resistor is effective at significantly reducing the inrush current. Other benefits include that, because the core is saturated, there is no steady-state core loss. Further, because the secondary winding is disconnected when the core is saturated, the secondary loss is minimal, and only the primary winding dissipates power.

It should be understood that the saturable core may take any shape. For example and without limitation, ER18 planar cores can be used. It should also be understood that an increase in the size of the core cross-section (Ae) results in a longer magnetic timer duration (e.g., the reflected circuit is established for a longer time).

The saturable core may be made of any suitable core material. For example, and without limitation, the saturable core may be made of N87 ferrite. Selecting a core material with a higher saturation limit (Bsat) or a lower remanence (Br) results in a longer magnetic timer duration. Selecting a core material with soft saturation characteristics can produce a smoother transition between the unsaturated portion of the current limiter waveform and the saturated portion, which may be useful in some applications. An ungapped, gapped, or distributed gap core may be used. Distributed gap cores may provide a desirable combination of high Bsat, low Br, and soft saturation characteristics. Because the core is saturated during steady-state, virtually eliminating steady-state core loss, high core loss materials may be used.

It should be understood that an increase in the number of turns of the primary winding results in a longer magnetic timer duration and a higher DC resistance. It should also be understood that any turns ratio of the transformer can be utilized (e.g. 1:1 ratio). It should also be understood that characteristics of the reflected circuit can be changed by changes to turn ratio.

Figure 7:
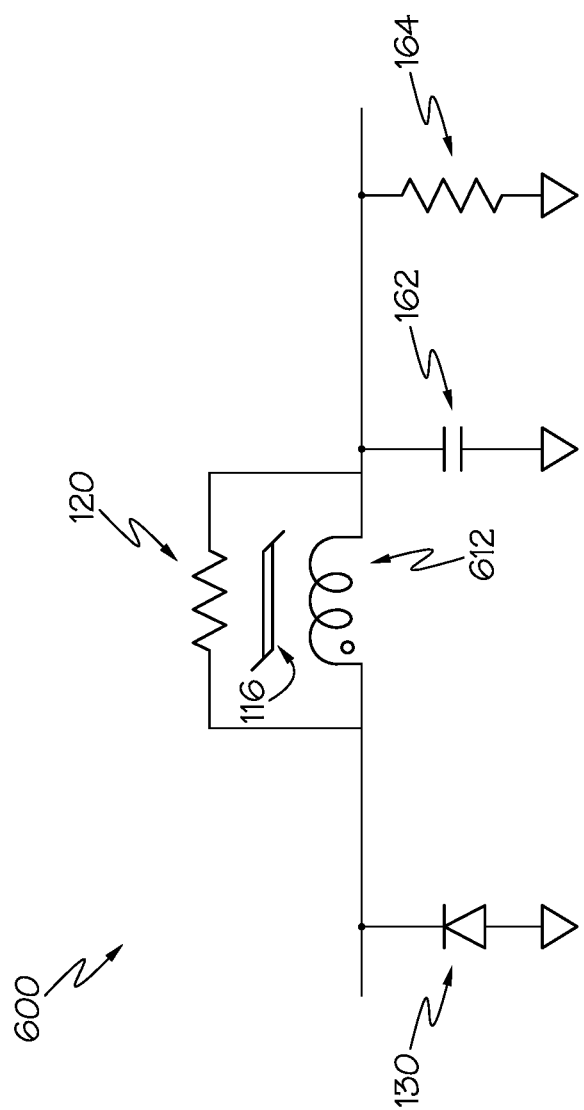
FIG. 7 illustrates another example inrush current limiter having an inductor and a saturable resistor.

Referring now to FIG. 7, an example inrush current limiter 600 comprising an inductor 612 with a saturable core and a current-limiting resistor 120 in parallel with the inductor is illustrated. The inductor 612 has similar electrical performance as a 1:1 transformer with a saturable core but does not require a secondary winding. When voltage is initially applied, surge current will flow through the resistor 120 for a period of time until the saturable core of the inductor 612 saturates, at which time the inductor 612 becomes essentially a short such that the resistor 120 is shorted and by-passed. Thus, a current through the resistor when the saturable magnetic core is saturated is less than a current through the resistor when the saturable magnetic core is not saturated.

The inrush current limiters described herein can allow for a lower cost and/or a shorter lead times, particularly in space or other applications where radiation-hardened components are required.

Figure 8:
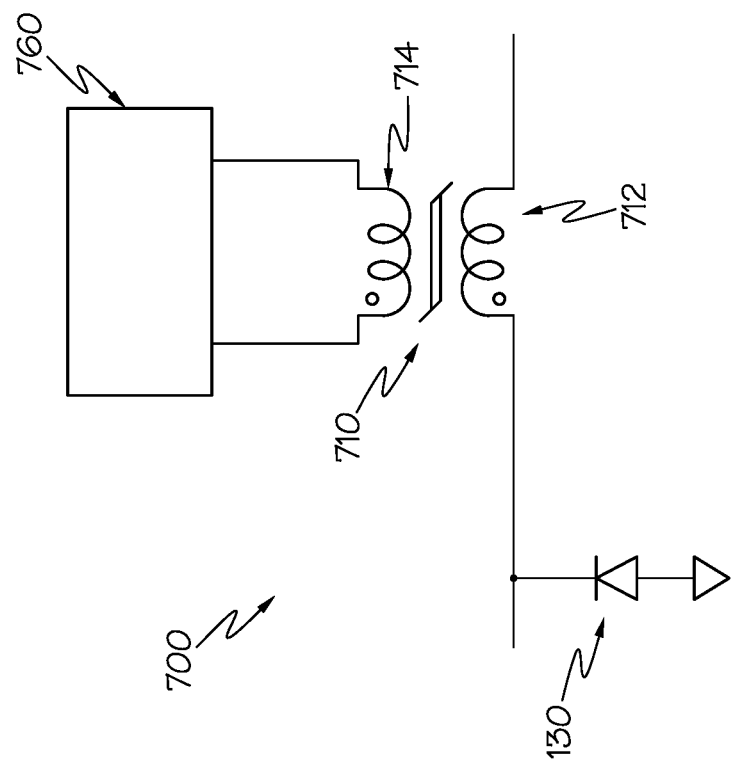
FIG. 8 illustrates an example circuit comprising a magnetically saturable component according to one or more embodiments described and illustrated herein.

Saturable components other than a resistor may be utilized. Referring now to FIG. 8, an example saturable circuit 700 includes a transformer 710 having a primary winding 712 and a secondary winding 714, a free-wheeling diode 130, and a saturable component 760 coupled to the secondary winding 714 of the transformer. The saturable component 760 may be any electronic component, or circuit comprising a plurality of electronic components. For example, saturable resistors, capacitors, diodes, Zener diodes, transistors and entire saturable circuits may be created. Such saturable components 760 or circuits may be active when voltage is applied to the primary winding until the magnetically saturable core of the transformer reaches saturation. At this point, the saturable component or circuit "disappears" and is no longer active.

For the purposes of describing and defining embodiments of the present disclosure, it is noted that the terms "about" and "substantially" are utilized herein to represent the inherent degree of uncertainty that may be attributed to any quantitative comparison, value, measurement, or other representation. The terms "about" and "substantially" are also utilized herein to represent the degree by which a quantitative representation may vary from a stated reference without resulting in a change in the basic function of the subject matter at issue.

The foregoing description of the various embodiments described herein has been presented for the purposes of illustration and description. It is not intended to be exhaustive or to limit the embodiments to the precise steps and/or forms disclosed. Many alternatives, modifications and variations will be apparent to those skilled in the art of the above teaching. Moreover, although multiple inventive aspects have been presented, such aspects need not be utilized in combination, and various combinations of inventive aspects are possible in light of the various embodiments provided above. Accordingly, the above description is intended to embrace all possible alternatives, modifications, combinations, and variations that have been discussed or suggested herein, as well as all others that fall with the principles, spirit and broad scope as defined by the claims.

The invention claimed is:

1. An inrush current limiter, comprising:
   a transformer comprising a primary winding, a secondary winding and a saturable magnetic core shared therebetween;
   a resistor connected in parallel with the secondary winding, wherein an impedance of the resistor is reflected across the transformer when a voltage is applied across the primary winding and the saturable magnetic core is not saturated; and
   a diode connected between the primary winding and ground such that magnetizing current of the saturable magnetic core flows through the diode as a reset path to reset the saturable magnetic core to remanence.

2. The inrush current limiter of claim 1, wherein the transformer provides a magnetic timer such that after an expiration of the magnetic timer:
   the saturable magnetic core is saturated, and
   the primary winding and the secondary winding are decoupled, causing the primary winding to become a short such that the impedance of the resistor is not reflected across the transformer.

3. The inrush current limiter of claim 2, wherein a number of turns of the primary winding affects a duration of the magnetic timer.

4. The inrush current limiter of claim 2, wherein a saturation limit of the saturable magnetic core increases a duration of the magnetic timer.

5. A radiation hardened (rad-hard) circuit comprising the inrush current limiter of claim 2.

6. The inrush current limiter of claim 2, wherein the diode is configured to reset the saturable magnetic core.

7. The inrush current limiter of claim 2, wherein the expiration of the magnetic timer comprises reaching a voltage-time product of the transformer.

8. A circuit comprising:
the inrush current limiter of claim 1, connected in series between a power source and a load, wherein the power source is connected to the diode, the diode is connected to a first end of the primary and the load is connected to a second end of the primary.

9. The circuit of claim 8, wherein
the power source comprises a direct current (DC) voltage source, and
the load comprises a capacitor.

10. The circuit of claim 8, further comprising a Flyback converter power supply.

11. The circuit of claim 8, further comprising a capacitor and a second resistor, the second resistor connected between the capacitor and ground.

12. A radiation hardened circuit, comprising:
a transformer;
a diode connected between a first end of the transformer and ground, wherein magnetizing current of the transformer flows through the diode as a reset path to reset the saturable magnetic core to remanence;
a power source connected between the diode and ground; and
a load connected between a second end of the transformer and ground,
wherein:
an impedance is reflected across the transformer, and
the reflected impedance limits an inrush current.

13. The radiation hardened circuit of claim 12,
wherein the transformer comprises a primary winding and a secondary winding,
wherein the transformer provides a magnetic timer, and
wherein upon expiration of the magnetic timer:
the transformer is in a saturated state, and
the primary and the secondary are decoupled, causing the impedance to not be reflected across the transformer and causing the primary winding to become a short.

14. The radiation hardened circuit of claim 13, wherein the diode resets the transformer to an un-saturated state.

15. The radiation hardened circuit of claim 14, wherein the diode comprises a free-wheeling diode.

16. The radiation hardened circuit of claim 13, wherein a number of turns of the primary affects a duration of the magnetic timer.

17. The radiation hardened circuit of claim 13, further comprising a resistor connected in parallel with the secondary winding.

18. The radiation hardened circuit of claim 13, wherein the expiration of the magnetic timer comprises reaching a specific voltage-time product of the transformer.

19. The radiation hardened circuit of claim 12, wherein the load is a Flyback converter power supply.

20. An inrush current limiter, comprising:
an inductor comprising a saturable magnetic core;
a resistor connected in parallel with the inductor, wherein a current through the resistor when a voltage is applied across the inductor and the saturable magnetic core is saturated is less than a current through the resistor when the voltage is applied across the inductor and the saturable magnetic core is not saturated; and
a diode connected between the inductor and ground such that magnetizing current of the saturable magnetic core flows through the diode as a reset path to reset the saturable magnetic core to remanence.

* * * * *